W. SKAIFE.
DOG CLUTCH.
APPLICATION FILED NOV. 13, 1919.
1,423,631.
Patented July 25, 1922.
3 SHEETS—SHEET 3.
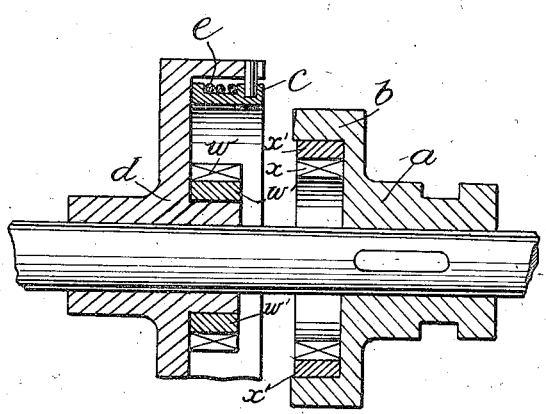
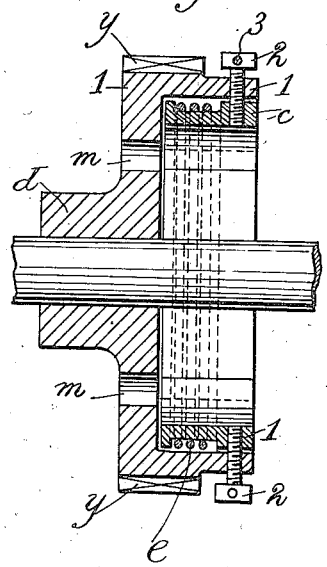

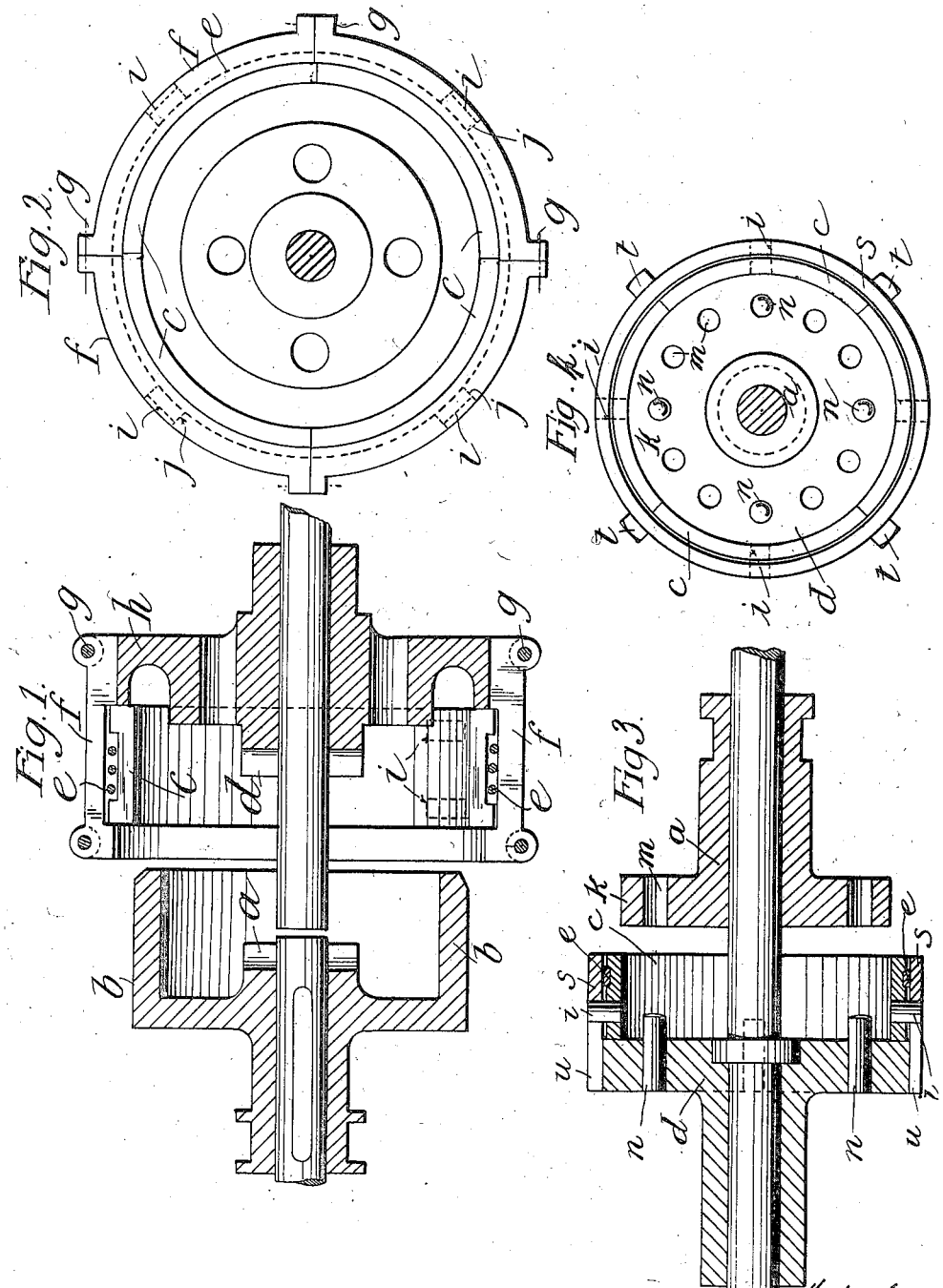

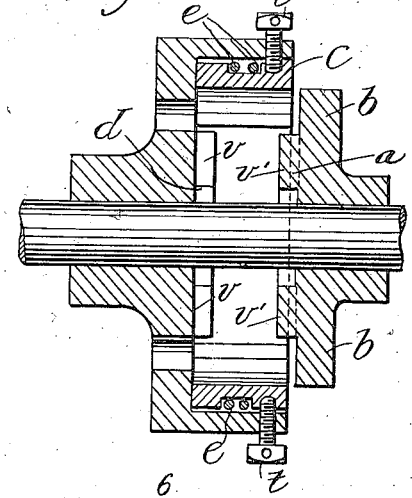
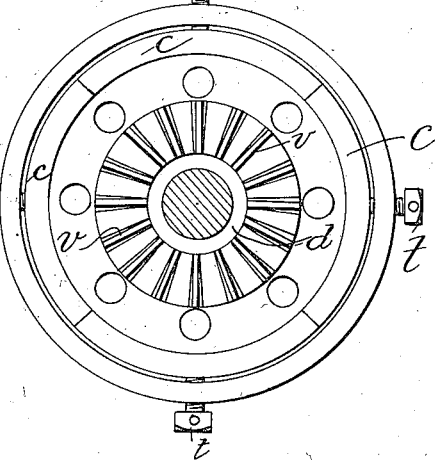
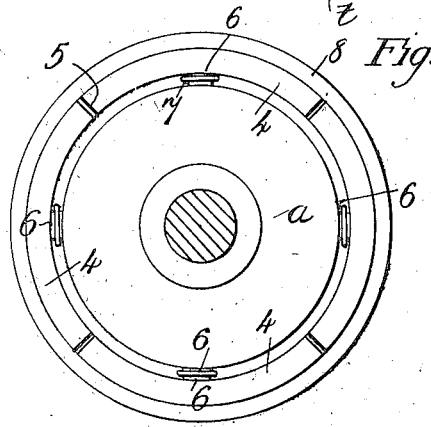
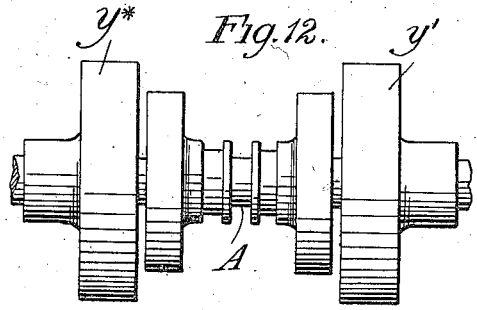
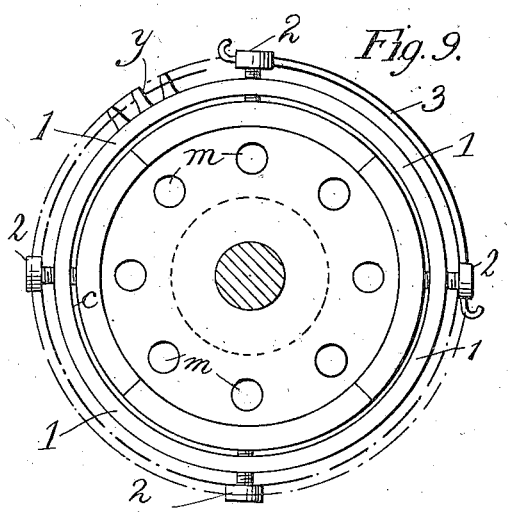
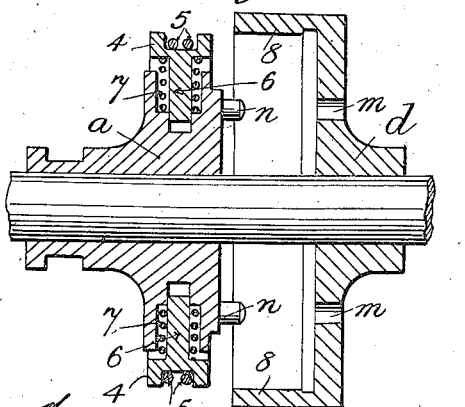

UNITED STATES PATENT OFFICE.

WALTER SKAIFE, OF LONDON, ENGLAND.

DOG CLUTCH.

1,423,631.  Specification of Letters Patent.  Patented July 25, 1922.

Application filed November 13, 1919. Serial No. 337,719.

*To all whom it may concern:*

Be known that I, WALTER SKAIFE, a subject of the King of Great Britain and Ireland, residing at London, England, have invented Improvements in or Relating to Dog Clutches, of which the following is a specification.

This invention relates to clutches of the kind wherein dog members upon independent rotary means are combined with devices of a frictional character adapted to be brought into use gradually to take up the drive until both shafts or equivalent are rotating at about the same speed whereupon the dog members can be smoothly engaged.

In accordance with the present invention one of the frictional devices is a circumferentially uninterrupted cylindrical member, such as has heretofore been proposed, but the companion device, in contradistinction to known arrangements comprising a split spring ring or a number of spring pressed pins, or friction members carried by arms movable about one end and embodying spring means, is constructed of ring segments movable in a direct radial direction under the action of an independant spring arrangement so that not only is there practically a complete circumferential friction driving surface upon both devices but the segments, their supporting means and the independent spring arrangement are concentrically and compactly arranged in a plane at right angles to the axis of the shafts to be coupled together.

The invention can be variously carried into effect as will be evident from the examples now about to be described with reference to the accompanying drawings whereof Fig. 1 is a longitudinal section of one construction of clutch according thereto and Fig. 2 is an end elevation of one portion thereof. Figs. 3 and 4 are respectively a longitudinal section and end elevation of another construction. Figs. 5 and 6 are respectively a longitudinal section of one element of yet another form of clutch and an end elevation corresponding thereto. Fig. 7 is a longitudinal section of a modification. Figs. 8 and 9 are views similar to Figs. 5 and 6 of a clutch suitable for say the gear box of a motor vehicle. Figs. 10 and 11 are also similar views to Figs. 3 and 4 of another gear box clutch. Fig. 12 is a view of gear embodying a double clutch according to the invention.

As shown in Figs. 1 and 2, a dog clutch member $a$ is employed having an overhanging cylindrical portion $b$ adapted to enter an overhanging portion $c$ of larger diameter with which the companion dog clutch member $d$ is provided.

The cylindrical portion $b$ may, as shown, conveniently be a continuous ring but the companion cylindrical portion $c$ is advantageously subdivided into segments shown in Fig. 2 as four quadrants, which in cross section are of channel shape, a coiled spring $e$ being housed in the channelled region so as to encircle all the segments and resist expansion of the ring when the cylindrical portion $b$ is forced between them. For convenience in construction, the divided ring $c$ may be confined within the outer casing $f$ which is itself subdivided into, say a number of parts equal to those of the inner ring member $c$, the several parts of the said outer casing being rigidly connected together, as by bolting one to the other at $g$ and thereby clamping them to the disc part $h$ of the dog clutch member $d$. Each segment of the inner ring $c$ may be prevented from turning within the casing $f$ by a pair of pins $i$ arranged radially to enter recesses or holes $j$ in such casing.

As will be understood, when the cylindrical portion $b$ is caused to enter the divided ring $c$ and slightly expand the latter against the action of the spring $e$, when the driving part of the clutch is rotating, the driving part of the clutch will gradually take up the drive and when the two parts are rotating at about the same speed the relative endwise movement of the two parts can be completed to cause the dog members $a$ and $d$ to become positively engaged to lock the two parts together.

Or as shown in Figs. 3 and 4, the continuous ring $b$ previously described as overhanging one dog member $a$ (Figs. 1 and 2) may be replaced by the periphery of a disc $k$ and the face of the disc be provided with a circular series of holes $m$ bored therein to receive a set of pins $n$ projecting from the face of the other dog member $d$, it being convenient to employ a greater number of holes $m$ than pins $n$ and to slightly taper or round off the pins, the holes, or both, as shown, to assist their mutual engagement. Furthermore, the outer casing $f$ described with reference to Figs. 1 and 2 as subdivided into parts corresponding to the divided ring member c confined thereby, may as shown in this example, be made in one piece s adapted to be attached, as by screws t, to the companion dog member d and be provided with a series of slots u extending towards the latter so that when removed from the said dog member, the pins i upon the inner ring segments c can be easily placed in position. Such pins can be reduced in number to one for each segment.

In lieu of pins n and holes m, the dog clutch members a and d may, as shown in Figs. 5 and 6, be provided with teeth $v$ $v^1$ formed upon juxtaposed disc surfaces on the said members and radiating from the shaft, thus resembling a pair of crown wheels of equal diameter. Or such a tooth arrangement may, as shown in Fig. 7, be replaced by one comprising an external and an internal series of teeth, $w$ and $x$ respectively, formed conveniently, on rings, $w^1$ and $x^1$ adapted to be secured to the respective clutch members a and d in cases where cutting of teeth directly upon the members cannot be easily performed.

In some cases, as shown in Figs. 8 and 9, the member d which serves to carry the internal subdivided ring c may be provided externally with teeth y so that it constitutes a wheel of change gear. Constructionally, such a member may comprise an overhanging hollow cylindrical part 1 through the wall of which holes are drilled to permit of the free passage therethrough of screws 2 employed in lieu of the rotation resisting pins i previously described as provided upon the segments of the internal subdivided ring c (see Figs. 1 to 4). Such screws, which are employed also in the arrangement shown in Figs. 5 and 6, can be readily placed in position and removed when desired and may be prevented from working loose in any convenient way, such as by coupling them in pairs, a wire 3 being say passed through holes in the heads of the screws in such a way as to resist rotation of the screws without interfering with movement of the subdivided ring c resulting as the act of operating the clutch.

In all the foregoing examples the subdivided ring c has constituted the socket member of the clutch but obviously the arrangement may be reversed, the several segments being then disposed around the periphery of a disc or like member and urged outwardly by a spring or springs to engage the inner periphery of the companion clutch member. For example as shown in Figs. 10 and 11 the segments 4 of the divided ring may be encircled collectively by a coiled spring 5 for the purpose of holding them together, and each be provided with a pin 6 or the like, entering a hole in a carrier disc forming part of the plug member a of the clutch, such pin being encircled by a coiled spring 7 for the purpose of causing effective driving connection between the plug and socket members when moved one into the other. The collective outward action of the springs 7 is sufficient to hold the segments in their normal outward positions against the contractile action of the coiled spring 5. The socket clutch member for co-operation with a plug clutch member thus constituted, will embody a continuous ring 8 opposing entrance of the divided ring segments 4 of the companion clutch member.

Clutches according to the invention may conveniently be incorporated in gear boxes for motor vehicle driving and the like; and, where desired, two plug members may, as shown in Fig. 12, be combined in a single structure so that either of two wheels $y^*$ or $y^1$ can be clutched at will to a constantly rotating shaft A by movement in one or other direction of the combined plug member from a neutral or idle position.

What I claim is:—

1. A clutch of the type herein referred to, comprising two rotary co-axial members provided with companion dog members one of which is adapted to be moved axially into the other, an annular friction clutch member comprising a plurality of segments carried by and adapted to rotate with one of said co-axial members and to act frictionally against the other co-axial member when one of such members is forced into the other and spring means holding said segments together.

2. A clutch of the type herein referred to, comprising plug and socket members having co-axial cylindrical surfaces, provided with companion dog members and adapted to be moved axially, one into the other, a friction ring, divided into segments, carried by and adapted to rotate with one of the said members and to engage frictionally with the other member when one member is moved into the other, said friction ring having an annular peripheral groove therein, and spring means located within said groove and tending to hold the segments of the ring together.

3. A clutch of the type herein referred to, comprising two co-axial rotary members capable of relative endwise movement and provided with companion dog members, one of said rotary members being adapted to act as a plug member, an overhanging ring carried by the other rotary member, an annular frictional clutch member divided into segments located within said ring and adapted to act as a socket member, means connecting said segments to said ring so that said segments will be constrained to move in a radial direction to but will rotate with said ring and spring means acting inwardly on said segments to force them radially into frictional driving contact with said plug member, when the same is forced between them, before the dog members come into positive driving contact with each other.

4. A clutch of the type herein referred to, comprising a series of radially movable ring segments, a spring encircling said segments, a rigid outer rotary ring constituting part of one of the clutch members and into which the segments are adapted to be expanded against the action of the encircling spring, means preventing rotation of the segments relative to the outer ring but acting to constrain such segments to move in a radial direction, and a second clutch member adapted to be moved relatively to and into the other clutch member and to come into frictional driving connection with said segments, said clutch members having dog members arranged to come into positive driving connection with each other after the clutch members having been brought into frictional driving connection with each other.

5. A clutch of the type herein referred to, comprising plug and socket members movable axially in relation to one another and having co-acting dog members, said socket member comprising a disc having an overhanging continuous ring, an annular friction clutch member divided into ring sections located within said ring and connected thereto so that they can move radially therein but will rotate therewith, a coiled spring common to and surrounding said segments and acting in a contractile manner on said segments which are capable of being pressed radially outward against the action of said spring when the plug member is forced into the ring of such segments and to exert a frictional driving connection therewith before the co-acting dog members come into positive driving connection with each other.

6. A clutch of the type herein referred to, comprising a disc-like member pierced with a number of holes arranged in a circle, a similar disc-like member provided with pins adapted to enter holes of the companion member, a series of ring segments associated with one of the disc members, a spring common to and encircling said segments and holding them normally against each other, a continuous outer ring carried by the last mentioned disc member and into which the segments are adapted to be expanded by relative endwise movement of the other disc member against the action of the spring and having holes therein and pins connected to the segments and adapted to work in a radial direction in the holes in said outer ring and to constrain the segments to rotate with the ring.

Signed at 10 New Court, Lincoln's Inn, London, England, this twentieth day of October 1919.

WALTER SKAIFE.